(12) United States Patent
Shao et al.

(10) Patent No.: US 8,699,421 B2
(45) Date of Patent: Apr. 15, 2014

(54) METHOD AND SYSTEM FOR WIRELESS COMMUNICATION USING CHANNEL SELECTION AND BANDWIDTH RESERVATION

(75) Inventors: Huai-Rong Shao, Santa Clara, CA (US);
Harkirat Singh, Santa Clara, CA (US);
Xiangping Qin, San Jose, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1115 days.

(21) Appl. No.: 12/014,709

(22) Filed: Jan. 15, 2008

(65) Prior Publication Data

US 2008/0175199 A1 Jul. 24, 2008

Related U.S. Application Data

(60) Provisional application No. 60/881,441, filed on Jan. 19, 2007.

(51) Int. Cl.
*H04W 4/00* (2009.01)

(52) U.S. Cl.
USPC ............... 370/329; 370/343; 370/480

(58) Field of Classification Search
USPC ......................... 370/329, 343, 480
See application file for complete search history.

(56) References Cited

U.S. PATENT DOCUMENTS

| | | | |
|---|---|---|---|
| 5,613,200 A * | 3/1997 | Hamabe | 455/450 |
| 5,754,138 A * | 5/1998 | Turcotte et al. | 342/373 |
| 5,819,182 A * | 10/1998 | Gardner et al. | 455/524 |
| 5,856,804 A * | 1/1999 | Turcotte et al. | 342/371 |
| 5,963,852 A | 10/1999 | Schlang et al. | |
| 6,330,459 B1 | 12/2001 | Crichton et al. | |
| 6,526,036 B1 | 2/2003 | Uchida et al. | |
| 6,853,629 B2 | 2/2005 | Alamouti et al. | |
| 6,980,839 B2 | 12/2005 | DaCosta | |
| 7,079,509 B2 | 7/2006 | Belcea | |
| 7,085,572 B2 | 8/2006 | Ishida | |
| 7,099,689 B2 | 8/2006 | Bahl et al. | |
| 7,103,344 B2 | 9/2006 | Menard | |
| 7,103,383 B2 * | 9/2006 | Ito | 455/562.1 |

(Continued)

FOREIGN PATENT DOCUMENTS

| | | |
|---|---|---|
| KR | 10-2002-0038823 A | 5/2002 |
| KR | 1020020038823 A | 5/2002 |
| KR | 1020040069516 A | 8/2004 |
| WO | WO 02/067459 A1 | 8/2002 |

OTHER PUBLICATIONS

Notification of Transmittal of the International Search Authority, Written Opinion for International Application No. PCT/KR2008/000316 dated Apr. 29, 2008, 11 pages.

(Continued)

*Primary Examiner* — Jay P Patel
(74) *Attorney, Agent, or Firm* — Kenneth L. Sherman, Esq.; Michael Zarrabian, Esq.; Sherman & Zarrabian LLP

(57) ABSTRACT

A method and system for wireless communication involves communicating via a control channel the channel occupation information with a discovered wireless station, based on the occupation information, selecting a wireless data channel for a new transmission with the discovered station and reserving bandwidth for the new transmission on the data channel simultaneous with one or more ongoing transmissions on the data channel.

38 Claims, 7 Drawing Sheets

(56) References Cited

U.S. PATENT DOCUMENTS

| | | | |
|---|---|---|---|
| 7,120,392 B2 | 10/2006 | Chu et al. | |
| 7,126,927 B2 | 10/2006 | Heijenk | |
| 7,155,264 B2 | 12/2006 | Twitchell | |
| 7,209,771 B2 | 4/2007 | Twitchell | |
| 7,227,851 B1 | 6/2007 | Gopalakrishnan et al. | |
| 7,272,134 B2 | 9/2007 | Iwama et al. | |
| 7,280,834 B2 | 10/2007 | Takarabe | |
| 7,327,981 B2 | 2/2008 | Hundal | |
| 7,359,733 B2 | 4/2008 | Liang et al. | |
| 7,519,399 B2 | 4/2009 | Suzuki | |
| 7,565,158 B1 | 7/2009 | Aholainen | |
| 7,596,367 B2 | 9/2009 | Kawasaki | |
| 7,653,163 B2 | 1/2010 | Sadri et al. | |
| 7,656,991 B2 | 2/2010 | Zhou et al. | |
| 7,724,656 B2 | 5/2010 | Sågfors et al. | |
| 7,725,555 B2 | 5/2010 | Chokshi et al. | |
| 7,747,218 B2 | 6/2010 | Sasai et al. | |
| 7,792,066 B2 | 9/2010 | Fujii et al. | |
| 7,822,440 B2 | 10/2010 | Park et al. | |
| 7,826,471 B2 * | 11/2010 | Wilson et al. | 370/442 |
| 7,843,819 B1 | 11/2010 | Benveniste | |
| 7,844,298 B2 | 11/2010 | Riley | |
| 7,848,706 B2 | 12/2010 | Vilzmann et al. | |
| 7,865,183 B2 | 1/2011 | Salokannel et al. | |
| 7,949,358 B2 | 5/2011 | Wentink et al. | |
| 7,957,777 B1 | 6/2011 | Vu et al. | |
| 8,027,282 B2 * | 9/2011 | Boehnke et al. | 370/311 |
| 8,108,414 B2 | 1/2012 | Stackpole | |
| 2003/0078062 A1 | 4/2003 | Burr | |
| 2004/0002357 A1 * | 1/2004 | Benveniste | 455/550.1 |
| 2004/0018818 A1 * | 1/2004 | Hottinen et al. | 455/78 |
| 2004/0032847 A1 * | 2/2004 | Cain | 370/338 |
| 2004/0063458 A1 | 4/2004 | Hori et al. | |
| 2004/0063468 A1 * | 4/2004 | Frank | 455/561 |
| 2004/0064309 A1 | 4/2004 | Kosai | |
| 2004/0179544 A1 * | 9/2004 | Wilson et al. | 370/442 |
| 2005/0003768 A1 * | 1/2005 | Laroia et al. | 455/101 |
| 2005/0047384 A1 * | 3/2005 | Wax et al. | 370/338 |
| 2005/0083873 A1 | 4/2005 | Yamamoto | |
| 2005/0177639 A1 * | 8/2005 | Reunamaki et al. | 709/227 |
| 2006/0045035 A1 | 3/2006 | Liu | |
| 2006/0067283 A1 | 3/2006 | So et al. | |
| 2006/0073847 A1 | 4/2006 | Pirzada et al. | |
| 2006/0194564 A1 | 8/2006 | Hokimoto et al. | |
| 2006/0198353 A1 | 9/2006 | Wason et al. | |
| 2006/0209772 A1 | 9/2006 | Fang et al. | |
| 2006/0217062 A1 | 9/2006 | Saffre et al. | |
| 2006/0251256 A1 | 11/2006 | Asokan et al. | |
| 2006/0268802 A1 | 11/2006 | Faccin | |
| 2007/0184853 A1 * | 8/2007 | Hottinen et al. | 455/456.1 |
| 2007/0253391 A1 * | 11/2007 | Shao et al. | 370/338 |
| 2007/0268972 A1 | 11/2007 | Kim | |
| 2007/0286136 A1 | 12/2007 | Rittle et al. | |
| 2008/0002652 A1 | 1/2008 | Gupta et al. | |
| 2008/0005219 A1 | 1/2008 | Nabar et al. | |
| 2008/0031208 A1 | 2/2008 | Abhishek et al. | |
| 2008/0056390 A1 | 3/2008 | Rainbolt et al. | |
| 2008/0119209 A1 | 5/2008 | Upp | |
| 2008/0130617 A1 | 6/2008 | Singh et al. | |
| 2008/0175197 A1 | 7/2008 | Shao et al. | |
| 2008/0175198 A1 | 7/2008 | Singh et al. | |
| 2008/0176521 A1 | 7/2008 | Singh et al. | |
| 2008/0176561 A1 | 7/2008 | Shao et al. | |
| 2008/0177886 A1 | 7/2008 | Singh et al. | |
| 2009/0185489 A1 | 7/2009 | Ruffini et al. | |
| 2010/0111006 A1 * | 5/2010 | Zhai et al. | 370/329 |
| 2011/0002243 A1 | 1/2011 | Sherman et al. | |

OTHER PUBLICATIONS

Notification of Transmittal of the International Search Authority, Written Opinion for International Application No. PCT/KR2008/000323 dated May 6, 2008, 10 pages.

Notification of Transmittal of the International Search Authority, Written Opinion for International Application No. PCT/KR2008/000318 dated May 6, 2008, 9 pages.

WirelessHD, LLC., "WirelessHD Specification, Revision 0.1," WirelessHD, LLC., Jul. 12, 2006, pp. i-167, United States.

International Search Report dated Apr. 28, 2008 for International Application No. PCT/KR2008/000326, filed Jan. 18, 2008, pp. 1-2, Seo-gu, Daejeon, Republic of Korea.

Hitachi, Ltd. et al., "High-Definition Multimedia Interface Specification, Version 1.2," HDMI Licensing, LLC., Aug. 22, 2005, pp. 1-214, United States.

IEEE Computer Society, "802.15.3™ IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs)," IEEE, Sep. 29, 2003, pp. 1-324, New York, United States.

Multiband OFDM Alliance Special Interest Group (MBOA-SIG) et al., "Distributed Medium Access Control (MAC) for Wireless Networks, Draft 0.99," MBOA-SIG and WiMedia Alliance, Inc., Nov. 1, 2005, pp. i-176, United States.

Notification of Transmittal of the International Search Authority, International Search Report and Written Opinion dated May 6, 2008 for International Application No. PCT/KR2008/000319, filed Jan. 18, 2008, pp. 1-10, Seo-gu, Daejeon, Republic of Korea.

Notification of Transmittal of the International Search Authority, International Search Report and Written Opinion dated Apr. 29, 2008 for International Application No. PCT/KR2008/000317, filed Jan. 18, 2008, pp. 1-10, Seo-gu, Daejeon, Republic of Korea.

Shih, E. et al., "Wake on Wireless: An Event Driven Energy Saving Strategy for Battering Operated Devices," Proceedings of the 8th Annual ACM Conference on Mobile Computing and Netwoking, Sep. 23-26, 2002, pp. 1-12, Atlanta, USA, http://www.sigmobile.org/mobicom/2002/papers/p053-shih.pdf.

U.S. Non-final Office Action for U.S. Appl. No. 12/014,705 mailed Jan. 21, 2011.

ECMA International, "High Rate Ultra Wideband PHY and MAC Standard," Standard ECMA-368, 1st Edition, Ecma International, Dec. 2005, pp. i-312, Geneva, Switzerland.

U.S. Non-Final Office Action for U.S. Appl. No. 12/014,663 mailed Dec. 21, 2010.

U.S. Final Office Action for U.S. Appl. No. 12/014,663 mailed Jun. 21, 2011.

U.S. Non-Final Office Action for U.S. Appl. No. 12/014,693 mailed on Jan. 6, 2011.

U.S. Notice of Allowance for U.S. Appl. No. 12/014,693 mailed on Apr. 11, 2011.

U.S. Notice of Allowance for U.S. Appl. No. 12/014,693 mailed on Jul. 22, 2011.

Cidon, I. et al., "Fast Connection Establishment in High Speed Networks," Proceedings of the ACM Symposium on Communication Architectures & Protocols (SIGCOMM '90), 1990, pp. 287-296, ACM, United States.

Clark, D.D. et al., "An Analysis of TCP Processing Overhead," IEEE Communications Magazine, Jun. 1989, pp. 23-29, vol. 27, No. 6, IEEE, United States.

Crutcher, L.A. et al., "Connection Management for an ATM Network, " IEEE Network, Nov. 1992, pp. 42, vol. 6, No. 6: Abstract, IEEE, United States.

Korean Final Office Action dated Nov. 20, 2009 for Korean Patent Application No. 10-2008-7008114, filed on Apr. 3, 2008, pp. 1-2, Korean Intellectual Property Office, Seo-gu, Daejeon, Republic of Korea (A machine-generated English translation attached, p. 1).

Korean Final Office Action dated Aug. 31, 2010 for Korean Patent Application No. 10-2008-7009721, filed on Apr. 23, 2008, pp. 1-2, Korean Intellectual Property Office, Seo-gu, Daejeon, Republic of Korea (A machine-generated English translation attached, p. 1).

Korean Non-Final Office Action dated Mar. 8, 2010 for Korean Patent Application No. 10-2008-7009721, filed on Apr. 23, 2008, pp. 1-5, Korean Intellectual Property Office, Seo-gu, Daejeon, Republic of Korea (A machine-generated English translation attached, pp. 1-5).

(56) References Cited

OTHER PUBLICATIONS

Korean Non-Final Office Action dated Sep. 17, 2009 for Korean Patent Application No. 10-2008-7008114, filed on Apr. 3, 2008, pp. 1-3, Korean Intellectual Property Office, Seo-gu, Daejeon, Republic of Korea (A machine-generated English translation attached, pp. 1-2).

Lindgren, P. et al., "Fast Connection Establishment in the DTM Gigabit Network," Proceedings of the IFIP TC6/WG6.4 Fifth International Conference on High Performance Networking V, 1994, pp. 283-294, North-Holland Publishing Company Amsterdam, The Netherlands.

U.S. Non-Final Office Action for U.S. Appl. No. 12/014,663 mailed Oct. 17, 2011.

U.S. Notice of Allowance for U.S. Appl. No. 12/014,693 mailed on Nov. 1, 2011.

WirelessHD, LLC, "WirelessHD Specification, Revision 0.2 Draft 1," WirelessHD, LLC, Jul. 12, 2006, pp. i-221, United States.

U.S. Requirement for Restriction/Election for U.S. Appl. No. 12/014,683 mailed Mar. 30, 2011.

U.S. Non-Final Office Action for U.S. Appl. No. 12/014,683 mailed Jul. 20, 2011.

U.S. Non-Final Office Action for U.S. Appl. No. 12/014,683 mailed Dec. 22, 2011.

U.S. Non-Final Office Action for U.S. Appl. No. 12/014,719 mailed Aug. 24, 2010.

U.S. Final Office Action for U.S. Appl. No. 12/014,663 mailed Apr. 23, 2012.

U.S. Non-Final Office Action for U.S. Appl. No. 12/014,663 mailed Jul. 17, 2012.

U.S. Final Office Action for U.S. Appl. No. 12/014,683 mailed Jun. 8, 2012.

U.S. Notice of Allowance for U.S. Appl. No. 12/014,663 mailed Nov. 13, 2012.

U.S. Notice of Allowance for U.S. Appl. No. 12/014,683 mailed Mar. 13, 2013.

* cited by examiner

METHOD AND SYSTEM FOR WIRELESS COMMUNICATION USING CHANNEL SELECTION AND BANDWIDTH RESERVATION

RELATED APPLICATION

This application claims priority from U.S. Provisional Patent Application Ser. No. 60/881,441, filed on Jan. 19, 2007, incorporated herein by reference.

FIELD OF THE INVENTION

The present invention relates to wireless communication, and in particular to reserving wireless channels for wireless communication.

BACKGROUND OF THE INVENTION

Many communication systems implement infrastructure mode wireless networking for communication via central connection points (access points) for wireless local area network (WLAN) clients. An access point forwards data for the wireless clients, enabling the wireless clients to communicate with each other through the access point.

In some applications of infrastructure mode wireless networking, a wireless access point that functions as a coordinator uses an in-band control channel and stores the information of all wireless client devices associated with it. In this case a device can send an information request to the coordinator to obtain the information of other devices within the wireless network.

Such infrastructure mode assumes all devices can periodically receive beacons from the wireless coordinator, indicting channel occupation. However, one or more devices may be located outside the transmission coverage range of the coordinator. For example, if wireless device X wishes to discover wireless device Y, but one or both of the two devices are not within reach of the wireless coordinator, then the discovery mechanism fails. As such, there is a need for a method and system that allows devices to establish direct communication therebetween.

BRIEF SUMMARY OF THE INVENTION

The present invention provides a method and a system for wireless communication between wireless stations using channel selection and bandwidth reservation. One embodiment involves communicating channel occupation information with a discovered wireless station, based on the occupation information selecting a wireless data channel for a new transmission with the discovered station, and reserving bandwidth for the new transmission on the data channel simultaneously with one or more ongoing transmissions on the data channel.

One wireless station discovers another wireless station via a control channel, and the stations communicate channel occupation information via the control channel. Based on the occupation information, the stations select a data channel, such as a 60 GHz wireless data channel, for a new directional transmission therebetween. Reserving bandwidth on the selected data channel involves detecting interference from the new transmission on one or more ongoing directional transmissions, detecting interference from one or more ongoing directional transmissions on the new transmission, and reserving bandwidth for the new directional transmission on the data channel simultaneously with one or more ongoing directional transmissions on the data channel between other stations, which avoids interference between the new and ongoing transmissions.

Reserving bandwidth for the new transmission may include reserving channel time for simultaneous new directional and non-interfering ongoing transmissions on the data channel, such that at least a portion of the new transmission temporally overlaps with one or more non-interfering ongoing transmissions. Further, reserving channel time may include leaving sufficient non-overlapping channel time for dynamically redirecting the new and/or ongoing directional transmissions.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

Figure 1:
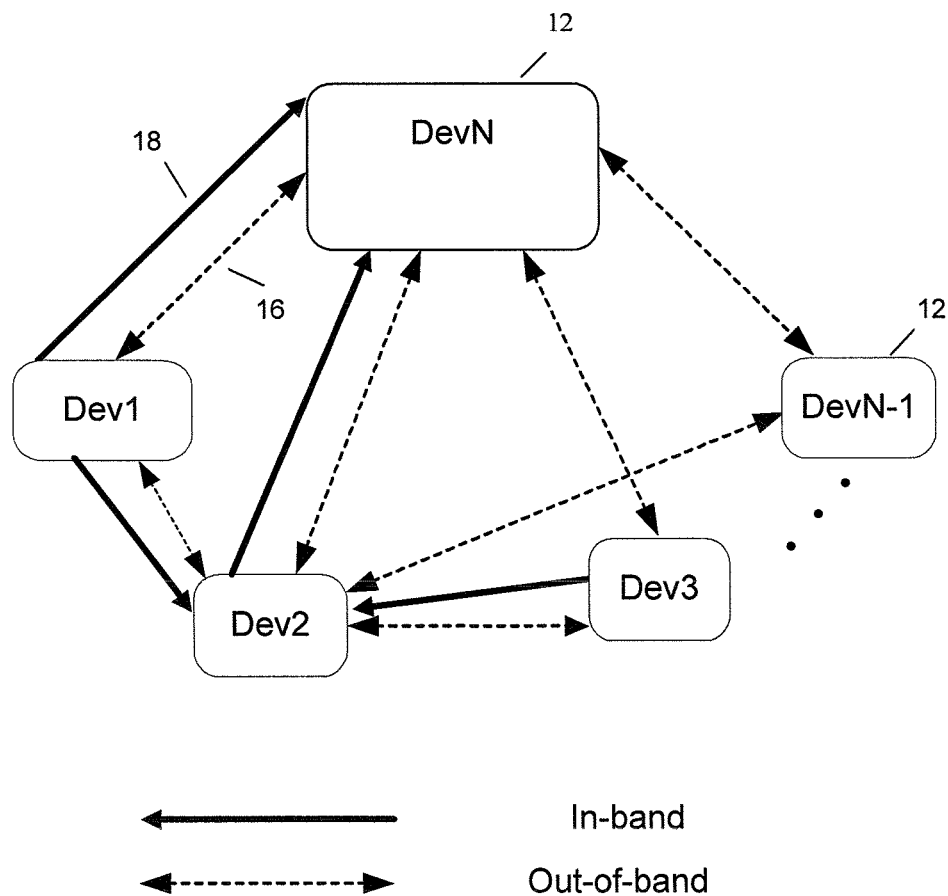
FIG. 1 shows a block diagram of a wireless network implementing wireless communication, according to an embodiment of the present invention.

The present invention provides a method and system for wireless communication between wireless stations using channel selection and bandwidth reservation. One embodiment involves communicating channel occupation information with a discovered wireless station, based on the occupation information selecting a wireless data channel for a new transmission with the discovered station, and reserving bandwidth for the new transmission on the data channel simultaneously with one or more ongoing transmissions on the data channel.

In one example, overlapping data channel reservations are made for communication between a pair of wireless stations. Time schedules are provided by beacons which include information about reserved channel time blocks for data communication. Time periods between the schedules are unreserved channel time blocks. The length of each reserved channel time block is defined in a schedule for a pair of stations. In one example, a beacon can include bandwidth allocation information element (IE), indicating channel occupation information (e.g., a certain duration of a channel time block is reserved for communication). Beacons can be placed anywhere in a beacon period (e.g., mMaxBeaconIntervalTime period) providing flexibility for point-to-point ad-hoc transmissions between wireless stations of a data channel, using a control channel for transmission of control messages and beacons.

The present invention is applicable to high throughput wireless communications, such as ECMA standards on millimeter wave (mm-wave) communication networks, and implementation of the Wireless HD standard on uncompressed video transmission. An example implementation for a 60 GHz frequency band wireless network is described below, useful with ECMA and Wireless HD (WiHD) applications. ECMA is an international organization in which TC32-TG48 task group specifies ECMA-60 GHz wireless protocol. Wireless HD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mmWave technology to support a physical (PHY) layer data transmission rate of multi-Gbps (gigabits per second), and can be used for transmitting uncompressed high definition television (HDTV) signals wirelessly. The present invention is useful with other wireless communication systems as well.

As noted, control channel (out-of-band channel) is used for control message transmissions. This helps reduce collisions and interferences between adjacent transmissions on a data channel (in-band channel), whereby multiple streams can be simultaneously transmitted on the same data channel using a directional transmission scheme. An out-of-band channel is a first physical channel that is out-of-band relative to a second physical channel (i.e., an in-band channel). The out-of-band channel occupies different frequency band from an in-band channel. For example, an in-band data transmission channel may operate on a 60 GHz frequency band, whereas, an out-of-band channel may operate on a 5 GHz or 2.4 GHz (or even another 60 GHz) frequency band. Out-of-band frequency means a different frequency band than in-band frequency band, even if both have the same carrier frequency. In an ad-hoc mode wireless communication process, each wireless client in a network forwards data for other wireless clients as determined based on the network connectivity, by using control channels for communicating control information messages to facilitate communication on a data channel.

FIG. 1 shows a functional block diagram of a wireless network 10 that may implement ad-hoc wireless communication between N wireless stations 12 (e.g., devices Dev1, . . . , DevN) on a 60 GHz frequency band using Frequency Division Duplex (FDD) channel access, according to an embodiment of the present invention. A control channel 16 is used for ad-hoc mode control message transmissions to coordinate the transmissions on a data channel 18.

At higher frequency bands such as 60 GHz there is much more free space loss than at lower frequencies such as 2 GHz or 5 GHz because free space loss increases quadratically with frequency increases. This higher free space loss can be compensated for, using multiple antennas with more pattern directivity, while maintaining small antenna dimensions, known as beamforming. When beamforming is used, antenna obstruction (e.g., by an object) and mis-pointing, may easily cause a substantial drop in received transmission power. This may nullify the advantage of using multiple antennas. Therefore, dynamic beamsearching and beamtracking are used to maintain stable beamforming transmission. Beamtracking involves monitoring the quality of beamformed transmission on a beamforming channel, while beamsearching involves searching for new beamforming coefficients to provide satisfactory channel quality. At higher frequencies such as 60 GHz transmissions, directional antennas can be used, wherein one or more directional antennas at a sender can physically point to a receiver to compensate for higher free space loss. Usually there is no dynamic beamsearching when directional antennas are used.

In the example network 10 shown in FIG. 1, the stations 12 operate in ad-hoc transmission mode. A coordinator may manage the stations within the transmission range of one another. The control channel 16 is omni-directional and the data channel 18 (e.g., 60 GHz) is directional. In one example, the control channel 16 can use different technologies such as Bluetooth, WLAN, other wireless technologies such as UWB, or even another different 60 GHz channel (e.g., same bandwidth or narrower than the data channel 18). The control channel 16 has the same coverage range as the data channel 18. The data channel 18 is an asymmetric channel (e.g., 60 GHz data transmission is for one-way transmission only). The control channel 16 is a symmetric channel and supports a half-duplex mode.

The data channel selection (e.g., to determine which 60 GHz data channel to use) for data communication between two stations is determined between the two stations (devices) by bandwidth reservation signaling on a default control channel (e.g., sending a bandwidth reservation request message and obtaining a bandwidth reservation response indicating if the bandwidth is reserved). Multiple transmissions can share the same data channel simultaneously by using directional transmission to avoid interference.

Figure 2:
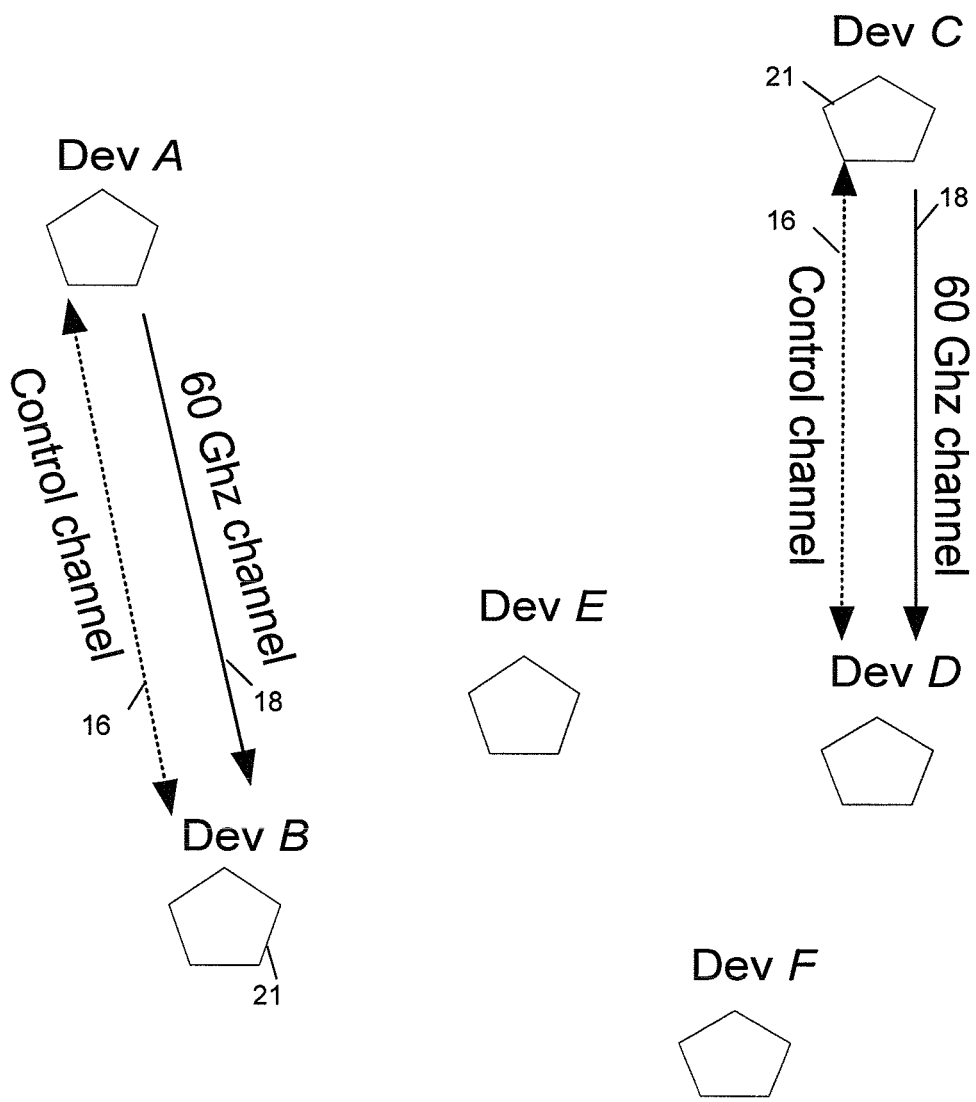
FIG. 2 shows an example configuration for ad-hoc wireless communication, according to the present invention.

FIG. 2 shows an example communication configuration in a network 20 including wireless stations 21 (e.g., station (Dev) A, station B, station C, station D, station E and station F), according to the present invention. The stations 21 use a control channel 16 and a data channel 18, such as a 60 GHz channel, as shown. In this example, stations A and B are involved in data communication on a data channel, and stations C and D are involved in data communication on a data channel. If data transmission from station A to station B does not interfere with data transmission from station C to station D, then stations A and B can simultaneously use the same data channel as stations C and D.

Figure 3:
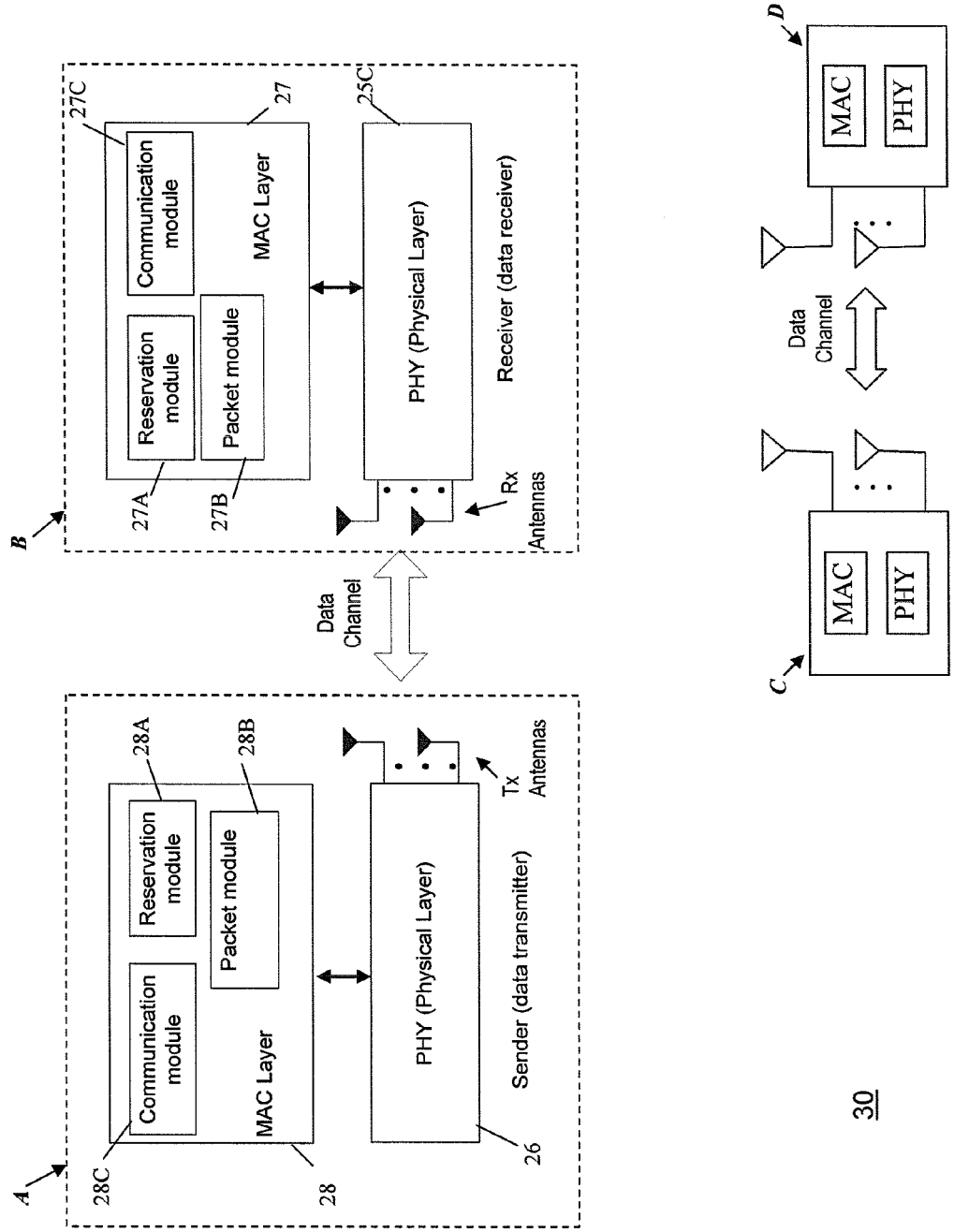
FIG. 3 shows a functional block diagram of an example wireless network that implements channel access control for wireless devices, according to the present invention.

FIG. 3 shows an example block diagram of an architecture for a wireless system/network 30 implementing channel selection and reservation for wireless devices, according to the present invention. The network 30 includes the wireless station A and the wireless stations C and D. Each station can function as an initiator or a responder, wherein a transmission initiator is a station that first initiates transmission and can be a transmission sender or receiver. A transmission responder is a station that responds to the transmission initiator and can be a transmission sender or receiver. The communication protocol can be an infrastructure mode or an ad-hoc mode communication protocol.

A frame structure may be used for data transmission between wireless stations. Frame aggregation can be used in a Media Access Control (MAC) layer and a PHY layer. The MAC layer obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

In the example shown in FIG. 3, station A functions as an initiator (sender) and station B functions as a responder (receiver). The station A includes a PHY layer 26 and a MAC layer 28. The MAC layer 28 implements a reservation module 28A, a packet module 28B and a communication module 28C. The station B includes a PHY layer 25 and a MAC layer 27. The MAC layer 27 implements a reservation module 27A, a packet module 27B and a communication module 27C. Each PHY layer 25, 26, may comprise one or multiple antennas.

The communication modules 27C, 28C enable the two stations to discover each other and perform association. After successful device discovery and association, the two stations select a data channel from m channels in the, e.g., 60 GHz frequency band. Then, the reservation modules 27A, 28A together implement channel time block reservation to allocate bandwidth at the selected data channel for data communication between stations A and B, according to the present invention.

A control channel, such as the channel 16, may be used as a default control channel for device discovery and association between the two stations A and B, facilitating channel selection, reservation, and data communication on a data channel 18. The control channel is mainly used for beacons and control message exchange between stations to discover and associate with other stations. Upon successful discovery and association, a channel is established by bandwidth reservation for communication (e.g., ad-hoc mode) on the selected data channel between the two stations. In addition, when the data channel is established, control messages may be transmitted on the control channel for facilitating communication on the data channel by the two stations.

Every station transmits its own beacon on the default control channel, and places therein channel occupation information that the station is aware of. A discovering station scans the default control channel to discover a partner station, before selecting a data channel (e.g., selecting a 60 GHz channel) and reserving bandwidth for data communication on the data channel.

In one example, the communication module 28C of station A scans the default control channel for at least a beacon interval to detect peak transmission energy from other stations, and analyzes beacons and other frames from a (potential) partner, such as station B, that the station A wishes to discover. If the station A as initiator for the new communication cannot receive any beacons from a partner, then the station sends out its own beacon with a device discovery IE on the default control channel. If station A receives a reply beacon from a partner on the default control channel, then station A and the partner (station B) have successfully discovered each other. However, when station A is a transmission responder and cannot receive any frames from a partner, such as station B, then station A keeps scanning the control channel for beacons from the partner (i.e., the transmission initiator). If station A receives a beacon sent from such a partner, then station A replies with a beacon as soon as possible, whereby station A and station B have successfully discovered each other. In the above discovery process, by only allowing the transmission initiator to send out beacons at the discovery stage, the probability of collision between the initiator and the responder may be reduced.

After successful discovery on the control channel is successfully completed, stations A and B transmit control packets on the control channel for association. During an association process, stations A and B exchange capability information on the control channel for establishing a communication data channel. Such capability information includes device profiles defining, e.g., the set of PHY (asymmetric or symmetric) capability, high-rate data capability, and other capabilities such as fixed or mobile, AC line or battery powered, Audio/Visual (AV) and/or data support, etc., for a station. The capability information is used by the stations to determine if they can associate for communication on a data channel.

After successful discovery and association between the discovering station A and the discovered/partner station B, the communication modules 27C and 28C select a 60 GHz data channel for communication, if both stations A and B have the capability to communication over the data channel (i.e., both stations include 60 GHz transceivers or are 60 GHz capable stations).

If both stations have such data communication capability, then they perform data channel selection (e.g., determine which 60 GHz data channel to use), and perform bandwidth reservation, by signaling, e.g., on the default control channel 16. In one example, after successful discovery and association, stations A and B select a data communication channel from m channels in the 60 GHz frequency band, and reserve bandwidth on the selected data channel for communication. For example, if each data channel is 2 GHz in-band, then m<4 in most regions of the world. An example data channel selection process is described below.

In ad-hoc mode, every station transmits its own beacon on the control channel, and places therein the channel occupation information that the station is aware of. Such channel occupation information includes information indicating if a data channel is in use, and by which stations (e.g., data channel bandwidth reservation information, data channel time scheduling information, etc.).

The initiator and the responder stations analyze the beacons received on the same default control channel, to obtain channel occupation information for each data channel. Specifically, when an initiator and a responder need to communicate on a data channel, the initiator waits to receive data channel occupation information from the responder. Thereafter, the initiator combines the received channel occupation information with its own channel occupation information, which allows the initiator to determine which data channel has sufficient available bandwidth for communication between the initiator and the responder.

For example, the responder station B transmits a data channel occupation information notification frame to the initiator station A over the control channel, to report the data channel occupation information obtained from the received beacons. Station A receives the data channel occupation information and combines the channel occupation information for itself and station B, to select a data channel for communication.

The initiator attempts to select a free 60 GHz data channel for transmission. The initiator selects a free 60 GHz channel if such a channel exists for the new ad-hoc transmission. If no free 60 GHz channel is available, then the initiator attempts to choose a data channel with sufficient free bandwidth for the ad-hoc transmission. If there is no sufficient bandwidth at any 60 GHz wireless channel, the initiator and the responder attempt an overlapping reservation. This involves reserving bandwidth on a selected data channel for directional communication between the initiator and responder pair of stations, simultaneously as another directional communication between another pair of stations is taking place on that selected data channel.

Figure 4:
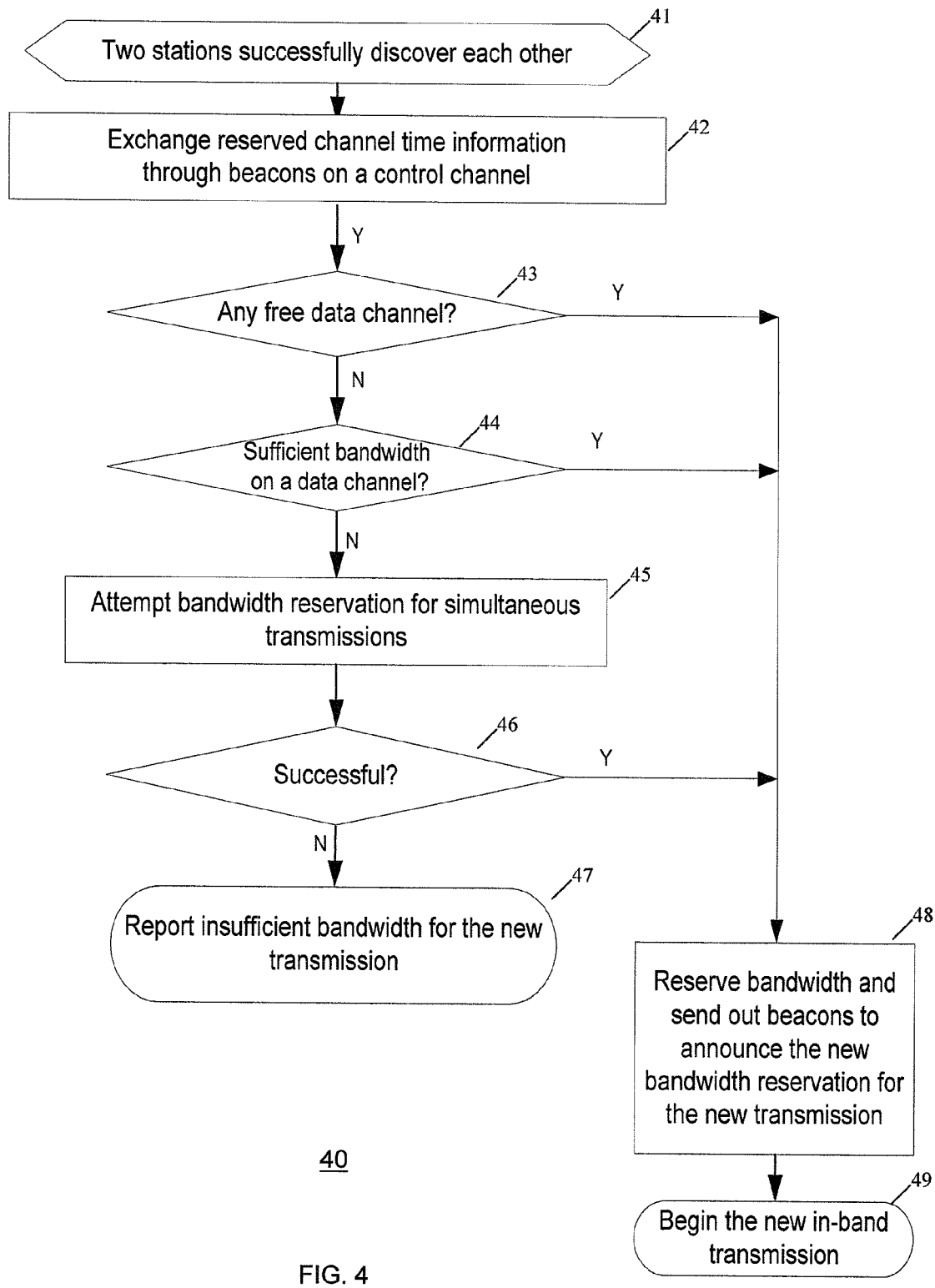
FIG. 4 shows an example channel selection and channel bandwidth reservation process, according to the present invention.

Referring to the flowchart in FIG. 4, an example process 40 for bandwidth reservation in selecting a 60 GHz in-band data channel among m data channels in a 60 GHz frequency band for a new ad-hoc transmission on a data channel between an initiator and responder, according to the invention is as follows.

Step 41: Two stations (initiator and responder) successfully discover each other.

Step 42: The initiator and the responder exchange reserved channel time information using beacons on a control channel (e.g., out-of-band channel).

Step 43: Based on the channel information, it is determined if any data channel (e.g., 60 GHz in-band channel) is free of existing reservations? If yes, the process proceeds to step 48.

Step 44: If no data channel is free of existing reservations, then it is determined if any data channel has sufficient bandwidth in between existing reservations, to reserve for new communication between the initiator and the responder? If yes, the process proceeds to step 48.

Step 45: Attempt overlapping bandwidth reservation on a selected channel for simultaneous transmissions with another pair of stations.

Step 46: Determine if overlapping reservation is successful? If yes, the process proceeds to step 48.

Step 47: No reservation possible. Report to the Application/User that there is insufficient bandwidth for the new transmission between the initiator and responder. Stop.

Step 48: Both the initiator (sender) and the responder (receiver) send out beacons to announce the new bandwidth reservation for the new transmission therebetween.

Step 49: Proceed to ad-hoc transmission stage between the initiator and responder during the corresponding reserved channel time periods.

Figure 5:
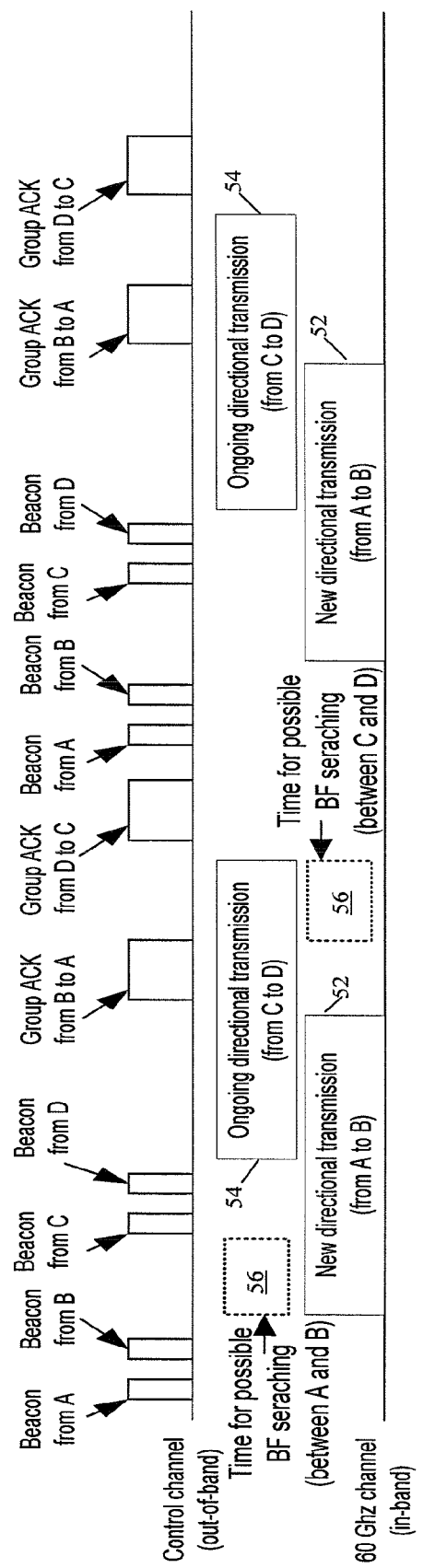
FIG. 5 shows an example timeline for bandwidth reservation and simultaneous directional transmission on a data channel, according to the present invention.

FIG. 5 shows an example overlapping channel reservation process 50 for the stations in FIG. 3. The stations A, B, C and D transmit periodic beacons on a control channel, wherein the beacons include channel reservation information that provides each station with channel occupation information by other stations. The stations C and D conduct ongoing directional transmissions on a 60 GHz data channel (in-band) during reservation periods 52. Then, after successful device discovery and association between the stations A and B, the initiator A selects a 60 GHz data channel which has the largest free channel bandwidth among all m available 60 GHz data channels. In this example, according to step 45 in FIG. 4, the selected data channel is that one utilized by the stations C and D for directional transmissions during the reservations periods 52.

To properly reserve channel time on the selected data channel, in one example a three step process is performed to achieve bandwidth reservation for simultaneous transmissions on that data channel, involving a new directional transmission (e.g., between stations A and B) and ongoing directional transmission (e.g., between stations C and D), while avoiding interference from the new directional transmission onto the ongoing directional transmissions (and vice versa).

First, the receiving station B scans the selected data channel to determine which of the ongoing directional transmissions on the selected data channel between other stations it cannot hear. These are transmissions that should not interfere with directional transmissions from station A to station B. As such, stations A and B may be able to reserve channel time for their transmissions during such ongoing transmissions that do no interfere with transmissions from station A to station B.

Second, stations A and B determine if the transmissions from station A to station B interfere with ongoing transmissions between other stations, such as ongoing transmissions from station C to station D. To achieve this, stations A and B reserve a free channel time block (non-overlapping with other reservations) and request that stations involved in ongoing transmissions, determine if transmissions from station A to station B interfere with their ongoing transmissions. For example, the stations A and B ask receiving station D to detect if transmissions from A to B interfere with station D receiving transmissions from station C. Third, stations A and B reserve channel time during those periods in which not only ongoing transmissions do not interfere with transmission from station A to station B, but also transmissions from station A to station B do not interfere with ongoing transmissions.

Figure 6:
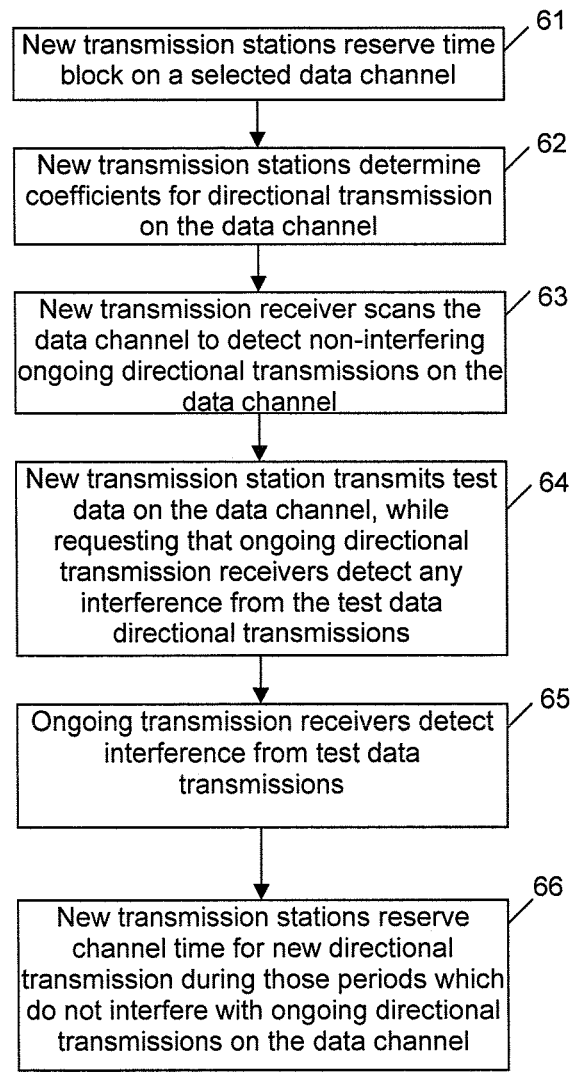
FIG. 6 shows an example process of bandwidth reservation and simultaneous directional transmission on a data channel, according to the present invention.

An implementation of the above three steps is now described in more detail in relation to the flowchart 60 in FIG. 6. The new transmission stations, station A (initiator) and the station B (responder), temporally reserve a time block at a free channel period of the selected data channel (step 61). The reservation is performed by transmitting beacons at both the stations A and B. Within the reserved time block, directional transmission/receiving coefficients for the stations A and B are determined using typical beamforming techniques such as training, beamsearching, beamforming, etc. (step 62).

Based on the information in the aforementioned beacons, the new transmission receiving station B is aware of the ongoing directional transmissions, though may not be able to hear all of them. In order to determine if an ongoing directional transmission on the selected data channel, such as transmission from station C to station D, may interfere with transmission from station A to station B, the new transmission station B scans the selected data channel with its directional receiving coefficients (step 63). The scanning results indicate which directional transmissions on the selected data channel the receiving station B cannot hear with its directional receiving coefficients. Specifically, if the energy detected for an ongoing directional transmission on the selected data channel is below an interference threshold, the station B determines that it cannot hear that ongoing transmission. The station B identifies in its beacon the ongoing directional transmissions that the station B cannot hear (i.e., non-interfering directional transmissions).

Stations A and B then determine if the transmissions from station A to station B interfere with ongoing transmissions between other stations, such as ongoing transmissions from station C to station D (step 64). Specifically, stations A and B temporally reserve a time block at the free channel periods of the selected data channel by sending out beacons which include an IE to request one or more receiving stations of the abovementioned ongoing non-interfering transmissions, to detect if transmission from station A to station B interfere with such ongoing transmissions. Then, within the reserved time block, testing data is transmitted from station A to station B using their directional transmission/receiving coefficients. The receivers in said ongoing transmissions, such as station D, scan the data channel during the testing data transmission time and report in their beacons if they can hear the testing data transmission from station A to station B (step 65).

Stations A and B reserve channel time during those periods in which not only ongoing transmissions do not interfere with transmission from station A to station B, but also transmissions from station A to station B do not interfere with ongoing transmissions (step 66). Specifically, after obtaining the detection results from the on-going transmission receivers, the stations A and B perform bandwidth reservation 52 for simultaneous directional transmission with the ongoing directional transmissions 54 with no interference. The reservation 52 attempts to minimize the transmission overlap between a new transmission from station A to station B, with the ongoing transmissions on the same data channel, such as ongoing transmission period 54 from station C to station D.

The reservation 52 also leaves sufficient non-overlapped channel time periods 56 for dynamic beamforming (BF) and searching the ongoing directional transmissions and/or the new directional transmission. This allows dynamically redirecting the transmissions in case of blockage or interference by using beam-searching. After beamforming, RF energy is focused in a specific angular direction by virtue of directional beams; it is possible that these directional beams are blocked by some obstruction such as human movement, a wall, thick furniture, etc. When ongoing directional communication between stations C and D is blocked by an object, dynamic beamsearching can be used to get around these obstructions to find other clear paths between the transmitter and the receiver which can meet the required SNR (signal to noise ratio) at the receiver. During the non-overlapped channel time periods 56, the new transmission is not simultaneous with other non-interfering ongoing transmission(s). As such, preferably, on the selected channel the reservations 52 for the new directional transmission and the reservations 54 for the ongoing transmissions are not totally overlapping in time. FIG. 5 shows such an example bandwidth reservation for simultaneous transmissions involving a new directional data transmission between stations A and B, and ongoing directional data transmission between stations C and D, to avoid interference from the new directional transmission onto the ongoing transmissions, and vice versa.

Figure 7:
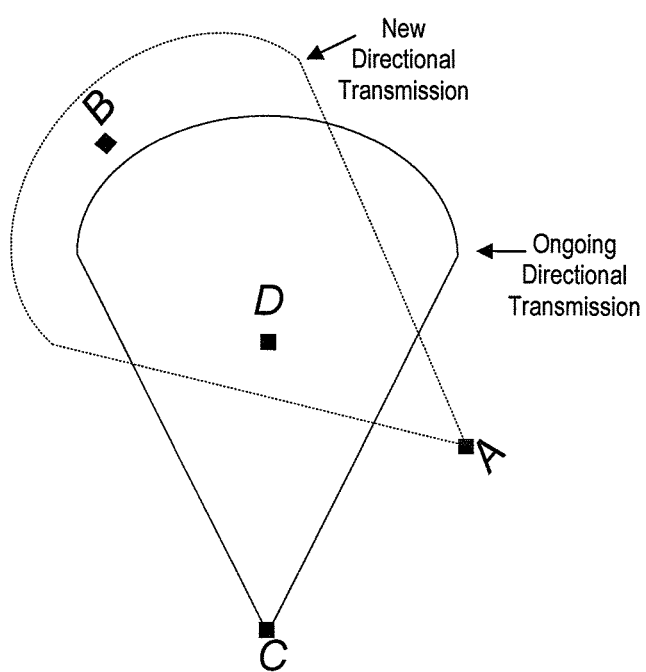
FIG. 7 shows an example interference issue than can be caused by a new transmission, avoided by channel bandwidth reservation, according to the present invention.

The above reservation process according to an embodiment of the present invention, allows stations with ongoing transmissions to detect possible interference caused by the new transmission. Therefore, interference problems such as shown by the example network 70 in FIG. 7 can be avoided in advance. In FIG. 7, new transmission stations A and B cannot hear the ongoing transmission from station C to station D. However, if the new transmission from station A to B has some channel time overlap with the transmission from station C to D, there will be interference between the new and ongoing directional transmissions on the same data channel. According to the present invention, transmission interference is checked at both the receiving stations B and D to ensure that simultaneous transmissions on the data channel, involving a new directional transmission between stations A and B, and ongoing directional transmission between stations C and D, are scheduled to avoid interference from the new directional transmission onto the ongoing directional transmission, and vice versa. Only the receiving stations B and D detect the channel interference to reduce process time overhead (no need for the transmitting stations A and C to detect interference).

The receiving stations B and D detect the channel interference with directional receiving modes to maximize the possibility of channel reuse (spatial reuse). The sender and receiver of the new directional transmission decide the directional transmission/receiving coefficients first before the receiver of the new directional transmission detects interference from ongoing transmissions (the receiver detects the channel with its directional receiving mode instead of omni-directional receiving mode). The receivers of the ongoing directional transmissions also operate on their directional modes to detect possible interference caused by the new directional transmission. If dynamic beam searching is allowed, the above bandwidth reservation scheme leaves sufficient un-overlapped time (e.g., periods 56 in FIG. 5) for beamsearching since during the beamsearching period the directional transmission/receiving coefficients may be changed. Further, steps 64 and 65 in FIG. 6 may be skipped, wherein if interference does occur in the transmission stage, then the stations can dynamically change bandwidth reservation by scanning the channels.

The example reservation modules 27A, 28A in FIG. 3 implement the above steps for reserving a channel, and after channel reservation the packet module 28B implements a packet transmission process and the receiver packet module 27B implements a packet receiving process.

Such a bandwidth reservation scheme can be applied based on the superframe structure, wherein beacons divide the channel time into multiple superframes. In each superframe there are contention periods and contention-free periods (CFP). In each CFP there are one or more schedules, wherein each schedule includes one or more reserved channel time blocks for transmission.

On each 60 GHz data channel, time division multiplex access (TDMA) is used for different data stream transmissions. In addition, simultaneous channel reuse with directional mode is provided, as described above, if TDMA cannot provide sufficient bandwidth for new transmissions. As noted, ongoing transmissions are announced by beacons on the control channel at both the sender and the receiver. A beacon can announce a schedule for one stream which can include one or multiple channel time blocks for one stream in between beacons. In each beacon for ad-hoc transmission, there is a field which indicates the time left for each channel time reservation. In addition, another beacon field indicates which data channel or control channel the reservation is for. The other fields of a beacon can be similar with those specified by Wireless HD. On the control channel, both a reservation-based and a contention-based channel control scheme can be used. No common beacon period of the type specified by MBOA (Distributed Medium Access Control for Wireless Networks specification) is required. Beacons can be transmitted at any time on the control channel, with data transmission time therebetween on the data channel. For one particular stream, both the sender and the receiver send out a beacon at the beginning of the reserved time block within each maximum beacons interval time (MaxBeaconIntervalTime).

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless communication, comprising:
    communicating channel occupation information with a discovered wireless station, wherein discovery between wireless stations is based on scanning a control channel for one or more beacons sent on the control channel from the discovered wireless station;
    based on the occupation information selecting a wireless data channel for a new transmission with the discovered station; and
    reserving bandwidth for the new transmission on the data channel simultaneous with one or more ongoing transmissions on the data channel based on reserving channel time for simultaneous directional transmissions on the data channel involving the new transmission and the ongoing transmissions that include searching for new beamforming coefficients, while avoiding interference between the new and ongoing transmissions.

2. The method of claim 1 further including initially discovering the discovered wireless station by scanning the control channel to detect beacons initiated by the discovered wireless station.

3. The method of claim 2, wherein communicating channel occupation information includes communicating occupation information over the control channel, wherein the channel occupation information includes channel bandwidth availability information.

4. The method of claim 3, wherein selecting the wireless data channel includes selecting the wireless data channel based on the channel bandwidth information.

5. The method of claim 4, wherein selecting the wireless data channel includes selecting a 60 GHz frequency band communication channel based on the channel bandwidth information.

6. The method of claim 1, wherein avoiding interference between the new and ongoing transmissions on the data channel includes detecting interference from the ongoing directional transmissions on the new transmission.

7. The method of claim 6, wherein avoiding interference between the new and ongoing directional transmissions on the data channel includes detecting interference from the new transmission on the ongoing transmission.

8. The method of claim 7, wherein reserving bandwidth for the new transmission includes reserving channel time for simultaneous directional new and non-interfering ongoing transmissions on the data channel, such that at least a portion of the new transmission temporally overlaps with one or more non-interfering ongoing transmissions.

9. The method of claim 8, wherein reserving channel time further includes leaving sufficient non-overlapping channel time for dynamically redirecting the new and/or ongoing directional transmissions.

10. A wireless station, comprising:
a processor coupled with:
a communication module configured for communicating channel occupation information with a discovered wireless station and based on the occupation information selecting a wireless data channel for a new transmission with the discovered station, wherein discovery between wireless stations is based on scanning a control channel for one or more beacons sent on the control channel from the discovered wireless station; and
a reservation module configured for reserving bandwidth for the new transmission on the data channel simultaneously with one or more ongoing transmissions on the data channel based on reserving channel time for simultaneous directional transmissions on the data channel involving the new transmission and the ongoing transmissions that include searching for new beamforming coefficients, while avoiding interference between the new and ongoing transmissions.

11. The wireless station of claim 10, wherein the communication module is further configured for initially discovering a wireless station by scanning the control channel to detect beacons initiated by the discovered wireless station.

12. The wireless station of claim 11, wherein the communication module is further configured for communicating channel occupation information over the control channel, wherein the channel occupation information includes channel bandwidth availability information.

13. The wireless station of claim 12, wherein the communication module is further configured for selecting the wireless data channel based on the channel bandwidth information.

14. The wireless station of claim 13, wherein the communication module is further configured for selecting a 60 GHz frequency band data communication channel based on the channel bandwidth information.

15. The wireless station of claim 10, wherein the reservation module is further configured for avoiding interference between the new and ongoing transmissions on the data channel by detecting interference from the ongoing directional transmissions on the new transmission.

16. The wireless station of claim 15, wherein the reservation module is further configured for avoiding interference between the new and ongoing directional transmissions on the data channel by detecting interference from the new transmission on the ongoing transmission.

17. The wireless station of claim 16, wherein the reservation module is further configured for reserving bandwidth for the new transmission by reserving channel time for simultaneous new directional and non-interfering ongoing transmissions on the data channel, such that at least a portion of the new transmission temporally overlaps with one or more non-interfering ongoing transmissions.

18. The wireless station of claim 17, wherein the reservation module is further configured for reserving channel time by leaving sufficient non-overlapping channel time for dynamically redirecting the new and/or ongoing directional transmissions.

19. A method of wireless communication, comprising:
discovering a wireless station via a control channel based on scanning the control channel for one or more beacons sent on the control channel from the wireless station;
communicating channel occupation information with the discovered wireless station via the control channel; and
based on the occupation information, selecting a 60 GHz wireless data channel for a new directional transmission with the discovered station;
detecting interference from the new transmission on one or more ongoing directional transmissions;
detecting interference from one or more ongoing directional transmissions on the new transmission; and
reserving bandwidth for the new directional transmission on the data channel simultaneously with one or more ongoing directional transmissions on the data channel between other stations that include searching for new beamforming coefficients, which avoids interference between the new and ongoing transmissions.

20. The method of claim 19, wherein reserving bandwidth for the new transmission includes reserving channel time for simultaneous new directional and non-interfering ongoing transmissions on the data channel, such that at least a portion of the new transmission temporally overlaps with one or more non-interfering ongoing transmissions.

21. The method of claim 20, wherein reserving channel time includes leaving sufficient non-overlapping channel time for dynamically redirecting the new and/or ongoing directional transmissions.

22. The method of claim 19 further includes providing channel occupation information and interference information in beacons.

23. The method of claim 20, wherein no common beacon period is required.

24. A method of wireless communication, comprising:
discovering a wireless station based on scanning a control channel for one or more beacons sent on the control channel from the wireless station;
communicating channel occupation information with the discovered wireless station via the control channel; and based on the occupation information, selecting a wireless data channel for a new directional transmission with the discovered station;
detecting interference from the new transmission on one or more ongoing directional transmissions;
detecting interference from one or more ongoing directional transmissions on the new transmission; and
reserving bandwidth for the new directional transmission on the data channel simultaneously with one or more ongoing directional transmissions on the data channel between other stations that include searching for new beamforming coefficients, which avoids interference between the new and ongoing transmissions.

25. The method of claim 24, wherein reserving bandwidth for the new transmission includes reserving channel time for simultaneous new directional and non-interfering ongoing transmissions on the data channel, such that at least a portion of the new transmission temporally overlaps with one or more non-interfering ongoing transmissions.

26. The method of claim 25, wherein reserving channel time includes leaving sufficient non-overlapping channel time for dynamically redirecting the new and/or ongoing directional transmissions.

27. The method of claim 24 further includes providing channel occupation information and interference information in beacons.

28. The method of claim 25, wherein no common beacon period is required.

29. A method of wireless communication, comprising:
based on occupation information of a discovered wireless station, selecting a wireless data channel for a new directional transmission with the discovered station, wherein discovery of the discovered wireless station is based on scanning a control channel for one or more beacons sent on the control channel from the discovered wireless station;
detecting interference from the new transmission on one or more ongoing directional transmissions;
detecting interference from one or more ongoing directional transmissions on the new transmission; and
reserving bandwidth for the new directional transmission on the data channel simultaneously with one or more ongoing directional transmissions on the data channel between other stations that include searching for new beamforming coefficients, which avoids interference between the new and ongoing transmissions.

30. A wireless transmitter, comprising:
a physical layer coupled with:
a communication module configured for communicating channel occupation information with a discovered wireless receiver and based on the occupation information selecting a wireless data channel for a new transmission with the discovered receiver, wherein discovery of the discovered wireless receiver is based on scanning a control channel for beacons sent on the control channel from the discovered wireless receiver; and
a reservation module configured for reserving bandwidth for the new transmission on the data channel simultaneously with one or more ongoing transmissions on the data channel based on reserving channel time for simultaneous directional transmissions on the data channel involving the new transmission and the ongoing transmissions that include searching for new beamforming coefficients, while avoiding interference between the new and ongoing transmissions.

31. A wireless receiver, comprising:
a physical layer coupled with:
a communication module configured for communicating channel occupation information with a discovered wireless transmitter and based on the occupation information selecting a wireless data channel for a new transmission with the discovered transmitter, wherein discovery of the discovered wireless transmitter is based on scanning a control channel for beacons sent on the control channel from the discovered wireless transmitter; and
a reservation module configured for reserving bandwidth for the new transmission on the data channel simultaneously with one or more ongoing transmissions on the data channel based on reserving channel time for simultaneous directional transmissions on the data channel involving the new transmission and the ongoing transmissions that include searching for new beamforming coefficients, while avoiding interference between the new and ongoing transmissions.

32. The method of claim 1, wherein the one or more ongoing transmissions on the data channel comprises:
performing dynamic beamsearching and dynamic beamtracking for beamforming transmission with one or more directional antennas.

33. The method of claim 32, wherein dynamic beamtracking comprises dynamically monitoring quality of beamformed transmission on the data channel, and dynamic beamsearching comprises dynamically searching for new beamforming coefficients for providing desired channel quality.

34. The method of claim 2, wherein the control channel is a default control channel.

35. The method of claim 32, wherein dynamic beamsearching and beamtracking are used for maintaining stable beamforming transmission.

36. A method of wireless communication, comprising:
based on occupation information of a discovered wireless station, selecting a wireless data channel for a new directional transmission with the discovered station, wherein discovery of the discovered wireless station is based on scanning a control channel for one or more beacons sent on the control channel from the discovered wireless station;
detecting interference from the new transmission on one or more ongoing directional transmissions; and
detecting interference from one or more ongoing directional transmissions on the new transmission by dynamically monitoring quality of beamformed transmission on the data channel, wherein the one or more ongoing directional transmissions on the new transmission include searching for new beamforming coefficients.

37. The method of claim 36, further comprising reserving bandwidth for the new directional transmission on the data channel simultaneously with one or more ongoing directional transmissions on the data channel between other stations.

38. A wireless station, comprising:
a physical layer coupled with:
a communication module that communicates channel occupation information with a discovered wireless station and based on the occupation information selecting a wireless data channel for a new transmission with the discovered station; and
a reservation module that reserves bandwidth for the new transmission on the data channel simultaneously with one or more ongoing transmissions on the data channel, wherein the one or more ongoing transmissions include searching for new beamforming coefficients.

\* \* \* \* \*